March 6, 1945. H. E. EDGERTON Re. 22,611
CONDENSER-DISCHARGE ELECTRIC SYSTEM
Original Filed Dec. 6, 1941
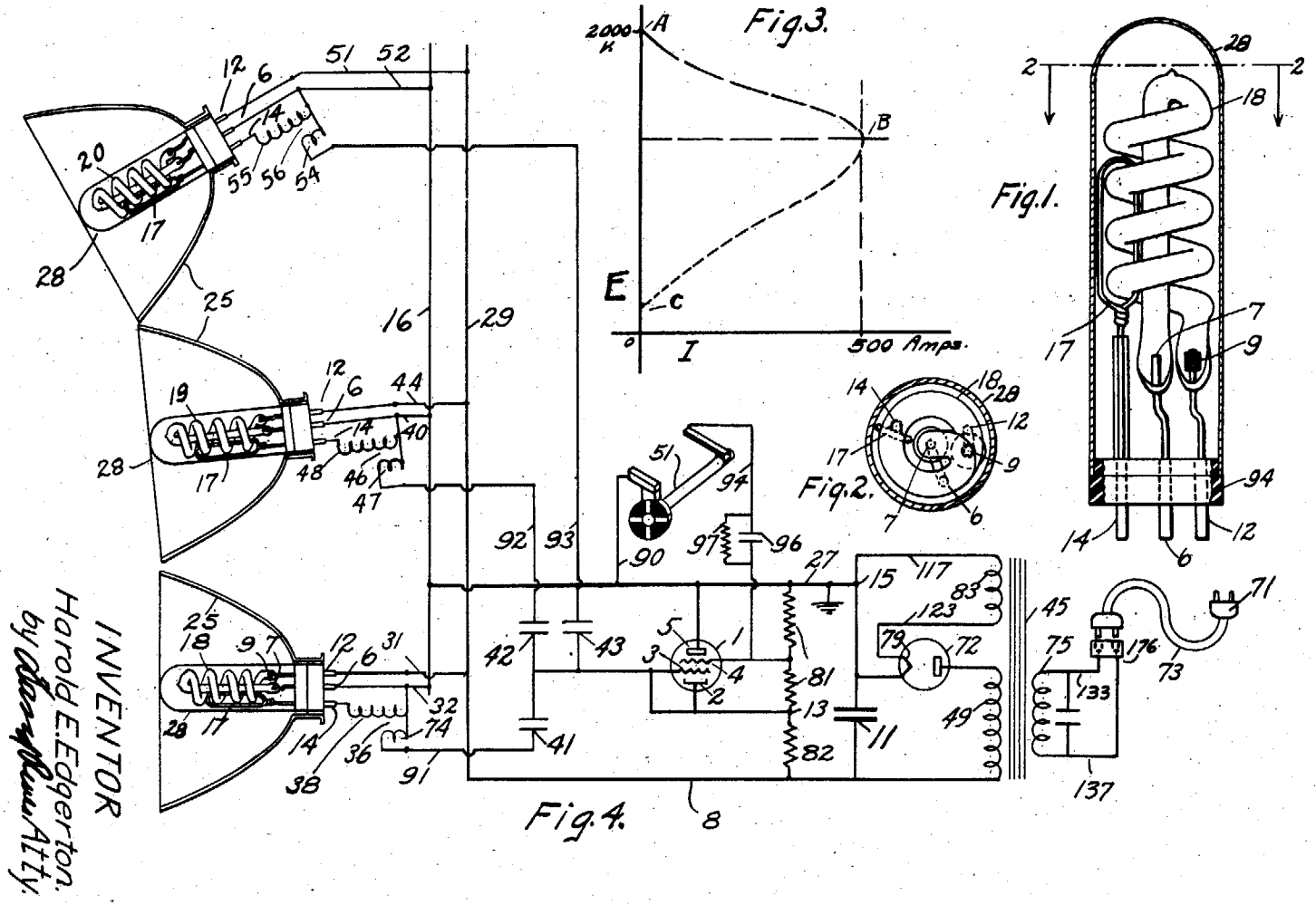

Reissued Mar. 6, 1945

Re. 22,611

UNITED STATES PATENT OFFICE 22,611

CONDENSER-DISCHARGE ELECTRIC SYSTEM

Harold E. Edgerton, Belmont, Mass.

Original No. 2,351,603, dated June 20, 1944, Serial No. 421,931, December 6, 1941. Application for reissue December 8, 1944, Serial No. 567,134

25 Claims. (Cl. 315—241)

The present invention relates to electric systems, and more particularly to condenser-charging-and-discharging systems.

A system now in common use for flash-producing and similar purposes comprises a condenser charged from a source of direct-current energy and the charge of which is thereupon dissipated in a discharge circuit comprising a gaseous-discharge device, like a flash-lamp. The resulting flash may, for example, be used in flash-photography.

It is frequently desired, however, in order to obtain improved lighting effects, to flash the object to be photographed from several directions at one and the same time. This, of course, requires a plurality of flash-lamps. When it is attempted to connect two or more such gaseous-discharge devices in parallel to the condenser, however, it is found that the condenser will discharge through only one of them, the other or others remaining inert.

It is accordingly an object of the present invention to provide for discharging the condenser simultaneously through a plurality of discharge devices connected in parallel to the condenser.

As study has disclosed that the reason for the failure of the condenser to discharge through more than one parallelly connected gaseous-discharge device is the relatively low resistance of the gaseous-discharge devices, a further object is to provide an electric system of the above-described character in which the parallelly connected gaseous-discharge devices have resistances sufficiently high to enable the voltage from the charged condenser to become stored up in each discharge circuit long enough to enable it to operate also on the other discharge circuits. When the condenser discharges through one of the gaseous-discharge devices, therefore, it will discharge also through the other gaseous-discharge devices. It is found that gaseous-discharge devices having positive voltage-current characteristic curves have sufficiently high resistance for the purpose in hand.

With these ends in view, a feature of the invention resides in connecting a single condenser through a single impedance to a source of direct-current energy to charge the condenser from the source, and connecting the condenser to a plurality of discharge devices of the above-described character, so as to effect discharge of the condenser simultaneously through the discharge devices. The discharge circuits are thus connected in parallel to the same single condenser, without any separating impedances.

Other and further objects will be explained hereinafter and will be particularly pointed out in the appended claims.

The invention will now be described in connection with the accompanying drawing, in which Fig. 1 is a longitudinal section of a preferred gaseous-discharge device a plurality of which may be connected in parallel across a discharge condenser in accordance with the present invention; Fig. 2 is a transverse section taken upon the line 2—2 of Fig. 1, looking in the direction of the arrows; Fig. 3 is a voltage-current characteristic curve of the gaseous-discharge device illustrated in Figs. 1 and 2; and Fig. 4 is a diagrammatic view of circuits and apparatus embodying the present invention.

The lower portion of the curve of Fig. 3 from the point B to the point C represents a positive voltage-current characteristic, such as may be obtained in a cathode-ray oscillograph with a gaseous-discharge device 18 such as shown in Figs. 1 and 2. The axis of abscissae represents current, I, and the axis of ordinates, voltage, E. Initially, at zero current, the voltage across the anode 7 and the cathode 9 of the gaseous-discharge flash-lamp device 18 may be about 2000 volts, as represented by the ordinate of the point A. When the hereinafter-described trip circuit is energized to effect a discharge of a condenser 11 through the gaseous-discharge device 18, between the cathode 9 and the anode 7, the volt-ampere characteristic progresses very rapidly along the upper portion of the curve of Fig. 3, from the point A to the point B, until the current, at the point B, attains a maximum value of about 500 amperes. Thereafter the current through the tube 18 drops, as indicated by the lower portion of the curve of Fig. 3, from the point B to the point C, until the current again drops to zero, as represented by the point C. At this time, the voltage, as shown by the ordinate of the point C, in Fig. 3 is relatively small, compared to the voltage represented by the ordinate of the point A. Depending upon the tube 18 and circuit conditions, this final voltage, represented by the ordinate of the point C, may even be negative. The upper portion of this characteristic, between the points A and B, is shown constituted of long dashes, and the lower part, between the points B and C, of short dashes. If these dashes, long and short, respectively, be regarded as representing time intervals of corresponding duration, the upper portion AB of the curve will be seen to be traversed in about one-third the time that the lower portion BC of the curve is traversed. Usually, the time required for the traverse of the portion A to B the curve is less than one-tenth of that for the portion B to C.

The resistance of the device 18 may be defined as the ratio of the voltage across its cathode 9 and its anode 7 at the time when the current is of a maximum value. From the curve of Fig. 3, it appears that the voltage is about 1500 at the time, represented by the point B, when the current has its maximum value of about 500. The resistance of the device 18, therefore, is approximately 3 ohms.

The positive-resistance characteristic, from the point B to the point C, is such that sufficient voltage remains across the hereinafter-described circuit, at the point B, so that other tubes 18 and 26, etc., in parallel with the tube 18, will have sufficient voltage across them to become ionized, even if the first tube 18 should start a few microseconds before the others. If the tubes have short lengths, with large cross sections, at low gas pressure, the point B on their characteristic will be reached quickly, and it will have so low a value that parallel-connected tubes will not flash, even if ionized by the herein-described starter electrode 17. The minimum value of the voltage corresponding to the point B for parallel operation is found to be in the range of voltage from 200 to 500 volts.

Higher-resistance gaseous-discharge devices 18 are particularly useful for connecting into parallel with the condenser 11, as hereinafter described. Lower-resistance gaseous-discharge devices, having characteristics the upper portions AB of which are steeper than illustrated in Fig. 3, cannot be employed in this way.

The gaseous-discharge device 18 may be of the type disclosed in Letters Patent 2,277,698, granted March 31, 1942, to Kenneth J. Germeshausen, or an application of the said Germeshausen, Serial No. 418,403, filed November 8, 1941. It is shown disposed within an elongated, light-permeable glass-bulb protective jacket or envelope 28, which is shown mounted in a reflector 25. It may contain krypton, xenon or any other suitable gas. The glass bulb 28 is cemented to a flat insulating base plug 94, provided with three plug-in pin terminals 6, 12 and 14 for connecting the gaseous-discharge device 18 into circuit. Other gaseous-discharge devices may, of course, also be employed in accordance with the present invention.

The gaseous-discharge device 18 is shown helically coiled, and provided at one end of the helix with a return center leg at the end of which the anode 7 is mounted, the cathode 9 being disposed at the other end of the helix. The anode 7 and the cathode 9 are respectively connected to the pin terminals 6 and 12. One end of the before-mentioned starter electrode 17, shown as a high-voltage spark trigger-wire or trip-wire flashing electrode, is connected to the plug-in terminal 14, and at its other end is mounted over a plurality of the coils or turns of the helical-tube gaseous-discharge device 18.

One side of the condenser 11 is shown connected by conductors 8 and 31 to the terminal pin 12. A grounded terminal 15 at the other side of the condenser is shown connected by conductors 27 and 32 to the terminal pin 6. The gaseous-discharge device 18 is thus connected across the condenser 11.

The condenser 11 may be discharged, as hereinafter more fully explained, by means of a triggering circuit comprising a normally ineffective, because non-conducting, gaseous-discharge trigger tube 1. The trigger tube 1 is shown connected to terminals 15 and 13 across an impedance 81, illustrated as a bleeder resistor, so as to be supplied with voltage therefrom. The bleeder resistor is connected in series with a bleeder resistor 82 across the condenser 11, which thus, by supplying energy to the bleeder resistor 81, constitutes the main power supply for the tube 1.

The tube 1 may, if desired, be of the cold-cathode gaseous-discharge type illustrated and described in Letters Patent 2,185,189, 2,201,166 and 2,201,167, issued to Kenneth J. Germeshausen, on January 2, 1940, and May 21, 1940. It may comprise an evacuated glass envelope containing several electrodes, namely, a solid cathode 2, an anode or plate 5, and one or more grids, inner and outer grids being shown at 3 and 4, between the anode 5 and the cathode 2. As explained in the said Letters Patent, the source of the electrons is a bright cathode spot on the surface of the cathode 2. Part of the impedance 81 is shown connected between the cathode 2 and the grid 4, and a further impedance (not shown) may, if desired, be connected between the cathode 2 and the grid 3.

A trigger-discharge circuit for a tripping condenser 41 is also connected to the terminals 13 and 15, in parallel with the tube 1. One side of the condenser 41 is connected in this discharge circuit to the terminal 13. The other side of the condenser 41 is connected, by way of a conductor 91, to the primary winding 74 of a tripping transformer 36 and, by way of conductors 32 and 27, to the terminal 15. The condenser 41 is thus connected in this discharge circuit in series with this primary winding 74. One side of the secondary winding 38 of the transformer 36 is grounded to the terminal 15 by way of the conductors 32 and 27. The other side of the secondary winding 38 is connected through the terminal 14 to the trip electrode 17. A return path is afforded by capacity coupling of the trip-wire electrode 17 to the flash-lamp 18. The discharge circuit of the condenser 41 thus contains the gaseous-discharge device 18 and the secondary winding 38, which operates as an induction coil.

The condenser 11 may be supplied with direct-current energy from any desired source, such as a battery. If a suitable source of alternating current, such as the ordinary 110 volt, 60-cycle house mains is available, however, the condenser 11 may be connected thereto by plugging at 71. The plug 71 is connected by input wires 73 to a jack 176, which is connected by conductors 133 and 137 to the primary winding 75 of a transformer 45. The secondary winding 49 of the transformer 45 is connected to the condenser 11 through a rectifier 72. The rectifier 72 may also be supplied with energy from this alternating-current source. To this end, its cathode 79 may be connected, by conductors 117 and 123, in circuit with a winding 83 that may constitute a further secondary winding for the primary winding 75 of the transformer 45.

A charging impedance, which may be constituted of resistance, or inductance, or both, may be connected in circuit between the condenser 11 and the secondary winding 49. This is not illustrated, because not needed if the secondary winding 49 has a high impedance, for it may then perform, also, the current-limiting function of a separate charging resistor or other impedance.

In this manner not only the condenser 11, but, also, the condenser 41 becomes charged from the same direct-current source 45, 72.

The tube 1 may be triggered, to initiate the discharge of the condenser 11 through the gaseous-discharge device, in any desired way, as by means of a manually controlled switch, but an automatically operated switch 51 is shown connected across the anode or plate 5 and the grid 4 of the tube 1. The connections may be traced from the grid 4, through a blocking condenser 96 and a leak resistor 97, in parallel, by way of a conductor 94, through the automatically operating switch 51 and, by way of a conductor 90, to the anode 5.

At any time after the direct-current source 45, 72 charges the condenser 11 to its maximum value, upon the closing of the automatically operating switch 51, the potential of the grid 4 will become raised until the break-down voltage between the grid 4 and the cathode 2, or the grid 4 and the grid 3, is exceeded. The normally ineffective trigger tube 1 thereupon becomes effective by being rendered conducting. Current then flows through the trigger tube 1, causing the condenser 41, which had become charged from the direct-current source 45, 72 simultaneously with the charging of the condenser 11, to discharge through its before-described trigger-condenser-discharge circuit comprising the primary winding 74 of the transformer 36. A resulting voltage-surge pulse of the secondary winding 38 of the transformer 36 becomes thus impressed upon the trigger electrode 17 of the gaseous-discharge tube 18. This causes the gas in the gaseous-discharge tube 18 to ionize, producing a conducting path through the device 18, and permitting the condenser 11 to discharge therethrough. The resulting high-voltage triggering spark through the flash-lamp 18 will yield a very brilliant exposure flash of extremely short duration. As the time taken for the trigger tube 1 to trip the gaseous-discharge device 18, between the closing of the switch 51 and the flash of light from the device 18, is very brief, it is possible to produce this very brilliant flash of light for a very brief period of time. When the condenser 11 is fully discharged, the gaseous-discharge device 18 extinguishes, and the cycle is ready for repetition.

The duration of the flash is nearly exponential in nature, and has a time constant approximately equal to the product of the capacity 11 by the resistance of the tube 18, if only one tube is used. If two similar flash tubes are used in parallel, the effective resistance is approximately half of that of one lamp 18. The resulting flash is half as long, but also contains half as much light from each tube. The total light is the same for both one or two tubes. If the lamps 18, 19, etc., have different resistances, the output and the duration of each are calculated approximately as though the lamps were resistors, using Ohm's law. The above methods are applicable only when the energy per flash is enough thermally to ionize the gas in the lamps. For the example shown, the tube may have dimensions as follows:

Inside diameter=6 mm.
Length between electrodes 7 and 9=15 inches.
Gas=xenon-krypton mixture at 7 cm. pressure (Hg).

The minimum capacity (at 2000 volts) for the condition of approximately constant resistance is about 5 or 10 microfarads.

According to the present invention a plurality of additional gaseous-discharge lamp devices, two of which are shown at 19 and 20, may be connected across the condenser 11 in parallel with the gaseous-discharge device 18. The pin terminals 12 of the gaseous-discharge devices 19 and 20 are shown connected to one side of the condenser 11, in parallel with the corresponding pin terminal 12 of the gaseous-discharge device 18, by conductors 8 and 29. The pin terminal 12 of the gaseous-discharge device 19 is shown connected to the conductor 29 by a conductor 44, and the pin terminal 12 of the device 20 by a conductor 51.

The terminals 6 of the gaseous-discharge devices 19 and 20 may, similarly, be connected, in parallel with the corresponding terminal 6 of the gaseous-discharge device 18, to the grounded terminal 15 at the other side of the condenser 11. The connections may be traced from the grounded terminal 15, by way of conductors 27 and 16, to a conductor 40 leading to the pin terminal 6 of the gaseous-discharge device 19 and a conductor 52 leading to the pin terminal 6 of the gaseous-discharge device 20.

Separate, tripping condensers 42 and 43, corresponding to the condenser 41, and separate tripping transformers 46 and 56, corresponding to the transformer 36, are provided for the gaseous-discharge devices 19 and 20. The condenser 42 and the primary winding 47 of the transformer 46, and the condenser 43 and the primary winding 54 of the transformer 56, are respectively series-connected in tripping condenser-discharge circuits, in parallel with the condenser 41 and the primary winding 74 of the transformer 36. The tripping condenser-discharge circuit for the gaseous-discharge device 19 may be traced from the terminal 13, through the condenser 42, by way of a conductor 92, through the primary winding 47 of the transformer 46, and by way of conductors 40, 16 and 27, to the grounded terminal 15. The tripping condenser-discharge circuit for the gaseous-discharge device 20 may be traced from the terminal 13, through the condenser 43, by way of a conductor 93, through the primary winding 54 of the transformer 56, and by way of conductors 52, 16 and 27, to the terminal 15.

The secondary winding 48 of the transformer 46 is connected to the pin terminal 14 of the gaseous-discharge device 19 and the grounded terminal 15 by way of the conductors 40, 16 and 27, and the secondary winding 55 of the transformer 56 is connected to the pin terminal 14 of the gaseous-discharge device 20 and the grounded terminal 15 by way of conductors 52, 16 and 27, in a manner similar to the connection of the secondary winding 38 of the transformer 36 to the terminal 14 of the gaseous-discharge device 18 and the grounded terminal 15.

By reason of the fact that the resistances of the gaseous-discharge devices 18, 19 and 20 are sufficiently high, as depicted by the characteristic curve of Fig. 3, a discharge of the condenser 11 will take place through not one only of the gaseous-discharge devices 18, 19 and 20, but simultaneously through all three of them. The total amount of energy discharged by the condenser 11 into these three gaseous-discharge devices 18, 19 and 20 is, of course, approximately the same as that which would be discharged through a single gaseous-discharge device, if no more than a single gaseous-discharge device were connected to the condenser 11. The energy discharged by the condenser 11 is the same, whether dissipated in one gaseous-discharge device or many.

It is frequently desirable, however, as before stated, to discharge the energy of the condenser 11 simultaneously through a plurality of gaseous-discharge devices 18, 19 and 20. In flash photography, for example, it is frequently desired to employ a number of flash-lamps 18, 19 and 20 disposed in different regions of the room so as to focus light upon the object to be photographed from different directions. According to the present invention this may be effected by connecting in parallel to the condenser 11, as illustrated, a plurality of flash-lamps 18, 19 and 20, each having a positive voltage-current characteristic, as illustrated in Fig. 3, and providing only a single current-limiting impedance for the condenser 11, which may be embodied in the secondary winding 49, or which may be constituted of a separate charging resistor or other impedance (not shown) connected between the secondary winding 49 and the condenser 11. If the voltage across the condenser 11 supplied by the secondary winding 49 and the rectifier 72 is, say, 2000 volts, the maximum current supplied by the condenser 11 may be in the neighborhood of 500 amperes, as illustrated in Fig. 3, and the resistors 81 and 82 may be so proportioned that a desired voltage of, say, 300 volts shall appear across the terminals 13 and 15 of the resistor 81.

Modifications will occur to persons skilled in the art and all such are considered to fall within the scope and spirit of the invention.

What is claimed is:

1. An electric system having, in combination, a condenser, means for charging the condenser, a plurality of gaseous-discharge devices, means for connecting the gaseous-discharge devices in parallel to the condenser, a plurality of triggering circuits, one connected to each of the gaseous-discharge devices, and means for simultaneously triggering the triggering circuits to effect a discharge of the condenser simultaneously through the gaseous-discharge devices.

2. An electric system having, in combination, a condenser, means for charging the condenser, a plurality of discharge circuits each having a gaseous-discharge device, means for connecting the discharge circuits in parallel to the condenser, a plurality of triggering circuits, one connected to each of the gaseous-discharge devices, a further discharge device, and means controlled by the further discharge device for controlling the triggering circuits to effect a discharge of the condenser through the gaseous-discharge devices, the gaseous-discharge devices having resistances sufficiently high so that when the condenser discharges through one of the gaseous-discharge devices it shall discharge simultaneously through the other gaseous-discharge device.

3. An electric system having, in combination, a condenser, a plurality of discharge circuits each having a gaseous-discharge device having a positive voltage-current characteristic curve, means for connecting the discharge circuits in parallel to the condenser, and a breaker circuit for effecting a discharge of the condenser through the gaseous-discharge devices, the breaker circuit having a breaker contact member and a condenser connected in series therewith.

4. An electric system having, in combination, two terminals that may be connected to a source of energy, a condenser that may be connected to the two terminals so as to become charged from the source, a plurality of discharge circuits each connected to the terminals and each having a gaseous-discharge device provided with a cathode and an anode respectively connected to the two terminals and a control electrode, a trigger circuit connected between the anode and the control electrode of each discharge device, and means for simultaneously triggering the trigger circuits to effect simultaneous discharge of the condenser into the discharge circuits.

5. An electric system having, in combination, a condenser, an impedance, means for connecting the condenser to a source of direct-current energy through the impedance to charge the condenser, a plurality of discharge circuits each having a gaseous-discharge device, means for connecting the discharge circuits in parallel to the condenser without substantial separating impedance between the parallelly connected discharge circuits and the condenser, and means for effecting a discharge of the condenser simultaneously into the discharge circuits.

6. An electric system having, in combination, a condenser, an impedance, means for connecting the condenser to a source of direct-current energy through the impedance to charge the condenser, a plurality of gaseous-discharge devices, means for connecting the gaseous-discharge devices to the condenser without substantial separating impedance between the gaseous-discharge devices and the condenser, and means for effecting a discharge of the condenser through the gaseous-discharge devices, the impedances of the gaseous-discharge devices being sufficiently high so that when the condenser discharges through one of the gaseous-discharge devices it shall discharge simultaneously through the other gaseous-discharge device or devices.

7. An electric system having, in combination, a condenser, an impedance, means for connecting the condenser to a source of direct-current energy through the impedance to charge the condenser, a plurality of gaseous-discharge devices, means for connecting the gaseous-discharge devices directly in parallel to the condenser without substantial separating impedance between the gaseous-discharge devices and the condenser, triggering means, and means for triggering the triggering means to effect a discharge of the condenser simultaneously through the gaseous-discharge devices.

8. An electric system having, in combination, a condenser, means for charging the condenser, a plurality of gaseous-discharge devices, means for connecting the gaseous-discharge devices directly in parallel to the condenser without substantial separating impedance between the gaseous-discharge devices and the condenser, and means for effecting a discharge of the condenser through the gaseous-discharge devices, the impedances of the gaseous-discharge devices being sufficiently high so that when the condenser discharges through one of the gaseous-discharge devices it shall discharge simultaneously through the other gaseous-discharge device or devices.

9. An electric system having, in combination, a condenser, means for charging the condenser, a plurality of gaseous-discharge devices each having a positive voltage-current characteristic curve, and means for connecting the gaseous-discharge devices directly in parallel to the condenser without substantial separating impedance between the gaseous-discharge devices and the condenser, and means for effecting a discharge of the condenser through the gaseous-discharge devices.

10. An electric system having, in combination, a condenser, means for charging the condenser, a plurality of discharge circuits each having a gaseous-discharge device, a plurality of tripping transformers, one for each discharge device, means for connecting each transformer to the corresponding discharge device, and means for simultaneously tripping the transformers to discharge the condenser into the discharge circuits.

11. An electric system having, in combination, a condenser, means for charging the condenser, a plurality of discharge circuits each having a gaseous-discharge device, means for connecting the discharge circuits in parallel to the condenser, a plurality of tripping condensers, one for each discharge device, means for connecting each tripping condenser to the corresponding discharge device, and means for simultaneously tripping the tripping condensers to effect a discharge of the first-named condenser simultaneously into the discharge circuits.

12. An electric system having, in combination, a condenser, means for charging the condenser, a plurality of gaseous-discharge devices each provided with a normally unenergized starting electrode, means for connecting the gaseous-discharge devices directly in parallel to the condenser without substantial separating impedance between the gaseous-discharge devices and the condenser, and means for simultaneously energizing the starting electrodes to discharge the condenser simultaneously through the gaseous-discharge devices.

13. An electric system having, in combination, a condenser, means for charging the condenser, a plurality of gaseous-discharge devices, means for connecting the gaseous-discharge devices directly in parallel to the condenser without substantial separating impedance between the gaseous-discharge devices and the condenser, a tripping transformer connected with each discharge device, a tripping condenser connected with each transformer, and means for simultaneously tripping the tripping condensers to trip the tripping transformers to effect a discharge of the first-named condenser through the gaseous-discharge devices, the gaseous-discharge devices having impedances sufficiently high so that when the first-named condenser discharges through one of the gaseous-discharge devices it shall discharge simultaneously through the other gaseoue-discharge device or devices.

14. An electric system having, in combination, a condenser, means for charging the condenser, a plurality of gaseous-discharge devices each having a positive voltage-current characteristic curve, means for connecting the gaseous-discharge devices directly in parallel to the condenser without substantial separating impedance between the gaseous-discharge devices and the condenser, and a breaker circuit for effecting a discharge of the condenser through the gaseous-discharge devices.

15. An electric system having, in combination, a condenser, an impedance, means for connecting the condenser to a source of direct-current energy through the impedance to charge the condenser, a plurality of discharge circuits, means for connecting the discharge circuits in parallel to the condenser without substantial separating impedance between the parallelly connected discharge circuits and the condenser to effect a discharge of the condenser simultaneously into the discharge circuits, and a contact member for controlling the discharge of the condenser.

16. An electric system having, in combination, a condenser, an impedance, means for connecting the condenser to a source of direct-current energy through the impedance to charge the condenser, a plurality of gaseous-discharge devices, means for connecting the gaseous-discharge devices directly in parallel to the condenser without substantial separating impedance between the gaseous-discharge devices and the condenser, a plurality of tripping transformers, one for each gaseous-discharge device, means for connecting each transformer to the corresponding discharge devices, and means for simultaneously tripping the transformers to effect a discharge of the condenser through the gaseous-discharge devices, the impedances of the gaseous-discharge devices being sufficiently high so that when the condenser discharges through one of the gaseous-discharge devices it shall discharge simultaneously through the other gaseous-discharge device or devices.

17. An electric system having, in combination, a condenser, means for charging the condenser, a plurality of gaseous-discharge devices each provided with a cathode, an anode and a control electrode, means for connecting the gaseous-discharge devices directly in parallel to the condenser without substantial separating impedance between the gaseous-discharge devices and the condenser, a plurality of transformers, one for each gaseous-discharge device, and each having a primary winding and a secondary winding connected between the anode and the control electrode of the corresponding gaseous-discharge device, and means for simultaneously energizing the primary windings to cause the secondary windings to effect control over the control electrodes, thereby to effect simultaneous discharge of the condenser through the gaseous-discharge devices.

18. An electric system having, in combination, a condenser, means for charging the condenser, a plurality of gaseous-discharge devices each provided with a cathode, an anode and a starting electrode, means for connecting the gaseous-discharge devices directly in parallel to the condenser without substantial separating impedance between the gaseous-discharge devices and the condenser, a tripping condenser connected to each starting electrode, and means for simultaneously tripping the tripping condensers to energize the starting electrodes, thereby to effect simultaneous discharge of the first-named condenser through the gaseous-discharge devices.

19. An electric system having, in combination, a condenser, an impedance, means for connecting the condenser to a source of direct-current energy through the impedance to charge the condenser, a plurality of gaseous-discharge devices each having a positive voltage-current characteristic curve, means for connecting the gaseous-discharge devices in parallel to the condenser without substantial separating impedance between the gaseous-discharge devices and the condenser, and a breaker circuit for effecting a discharge of the condenser simultaneously through the gaseous-discharge devices, the breaker circuit having a breaker contact member and a condenser connected in series therewith.

20. An electric system having, in combination, a condenser, an impedance, means for connecting the condenser to a source of direct-current energy through the impedance to charge the condenser, a plurality of gaseous-discharge devices each provided with a cathode, an anode and a control electrode, means for connecting the gaseous-discharge devices directly in parallel to the condenser without substantial separating impedance between the gaseous-discharge devices and the condenser, a triggering circuit connected between the anode and the control electrode of each discharge device, and means for simultaneously triggering the triggering circuits to discharge the condenser into the discharge circuits, the impedances of the gaseous-discharge devices being sufficiently high so that when the condenser discharges through one of the gaseous-discharge devices it shall discharge simultaneously through the other gaseous-discharge device or devices.

21. An electric system having, in combination, a condenser, an impedance, means for connecting the condenser to a source of direct-current energy through the impedance to charge the condenser, a plurality of gaseous-discharge devices each having a positive voltage-current characteristic curve and each having a cathode, an anode and a control electrode, means for connecting the discharge circuits in parallel to the condenser, and means controlled by the control electrodes for effecting a discharge of the condenser simultaneously through the gaseous-discharge devices.

22. An electric system having, in combination, a condenser, an impedance, means for connecting the condenser to a source of direct-current energy through the impedance to charge the condenser, a plurality of discharge circuits each having a gaseous-discharge device capable of carrying large currents and having a positive voltage-current characteristic curve, means for connecting the discharge circuits in parallel to the condenser, and means for effecting a discharge of the condenser through the gaseous-discharge devices.

23. An electric system having, in combination, a condenser, means for charging the condenser, a plurality of gaseous-discharge devices, means for connecting the gaseous-discharge devices in parallel to the condenser, triggering means, and means for triggering the triggering means to effect a discharge of the condenser simultaneously through the gaseous-discharge devices.

24. An electric system having, in combination, a condenser, means for charging the condenser, a plurality of gaseous-discharge devices, means for connecting the gaseous-discharge devices in parallel to the condenser, triggering means, and means for triggering the triggering means to effect a discharge of the condenser through the gaseous-discharge devices, the impedances of the gaseous-discharge devices being sufficiently high so that when the condenser discharges through one of the gaseous-discharge devices it shall discharge simultaneously through the other gaseous-discharge device or devices.

25. An electric system having, in combination, a condenser, means for charging the condenser, a plurality of gaseous-discharge devices each having a positive voltage-current characteristic curve, means for connecting the gaseous-discharge devices in parallel to the condenser, triggering means, and means for triggering the triggering means to effect a discharge of the condenser simultaneously through the gaseous-discharge devices.

HAROLD E. EDGERTON.